Figure 1:
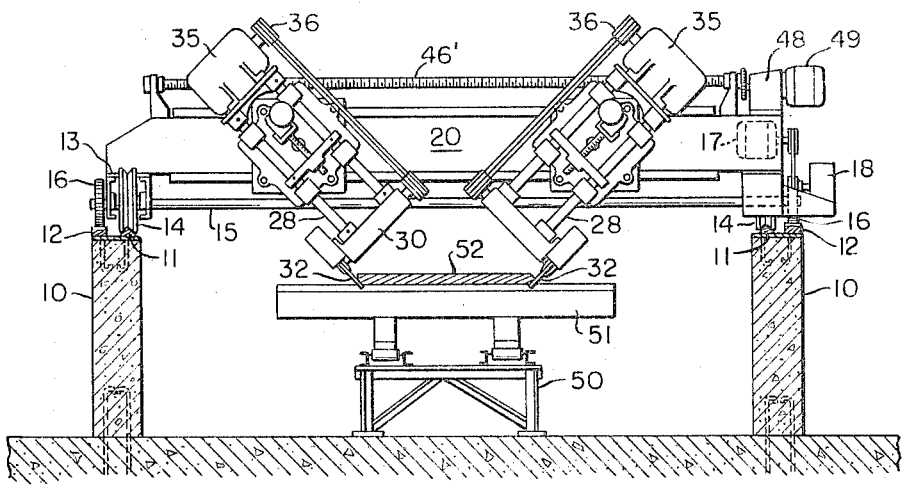

Dec. 6, 1966  L. I. GARRISON  3,289,662
DUAL HEAD SAWING MACHINE

Filed Feb. 4, 1964  3 Sheets-Sheet 1

INVENTOR.
Langdon I. Garrison
BY
Kenway, Jenney & Hildreth
Attys.

Dec. 6, 1966      L. I. GARRISON      3,289,662

DUAL HEAD SAWING MACHINE

Filed Feb. 4, 1964      3 Sheets-Sheet 3

INVENTOR.
Langdon I. Garrison
BY
Kenway, Jenney & Hildreth
Attys.

United States Patent Office 3,289,662
Patented Dec. 6, 1966

3,289,662
DUAL HEAD SAWING MACHINE
Langdon I. Garrison, Henniker, N.H., assignor to The John Swenson Granite Co., Inc., Concord, N.H., a corporation of New Hampshire
Filed Feb. 4, 1964, Ser. No. 342,465
5 Claims. (Cl. 125—14)

This invention comprises a new and improved dual head sawing machine for forming, trimming and beveling the slabs of granite, marble or other materials. While being of general utility in the stone sawing field the machine of my invention is constructed and arranged for the efficient production of rectangular slabs of granite having one or more beveled edges. Such slabs are used in the facing of modern buildings. To that end the machine includes in its structure a pair of saw-carrying heads constructed and arranged (1) for movement in parallel or inclined relation, (2) individual transverse movement toward and from each other, (3) progressive feeding movement vertically or at an inclination to deepen the cut, (4) adjustment to any angle of inclination with respect to a flat lying slab, and (5) capacity for reversibly setting up the assembly for wide and narrow cutting.

An important feature of the invention resides in the construction and arrangement of the individual saw heads adapting them for the list of versatile functions above enumerated. To this end each saw head is mounted upon the bridge of the machine for rotary adjustment about a horizontal axis so that the saws may be set individually in vertical or inclined cutting position. The head is characterized by a pair of tubes slidably mounted in the head and connected at their opposite ends. A motor is mounted at the upper end of these rods and a shaft carrying a rotary saw is mounted at the other end. The motor and saw are operatively connected by a belt drive which is maintained undisturbed in driving relation to the saw in all its various positions and throuhout all the adjusting and feeding movements of the saw. In this respect each saw head is a self-contained power operated unit capable of effective operation in any location in the machine as a whole.

The units have the further characteristic that they may be set up in either of two operative arrangements. That is to say, the rotary saws may be located at the outer sides of the units when they are to operate with a wide spacing as in trimming the opposite edges of a slab, or they may be located at the inner side of the units when they operate with a reduced or minimum spacing between them.

Figure 2:
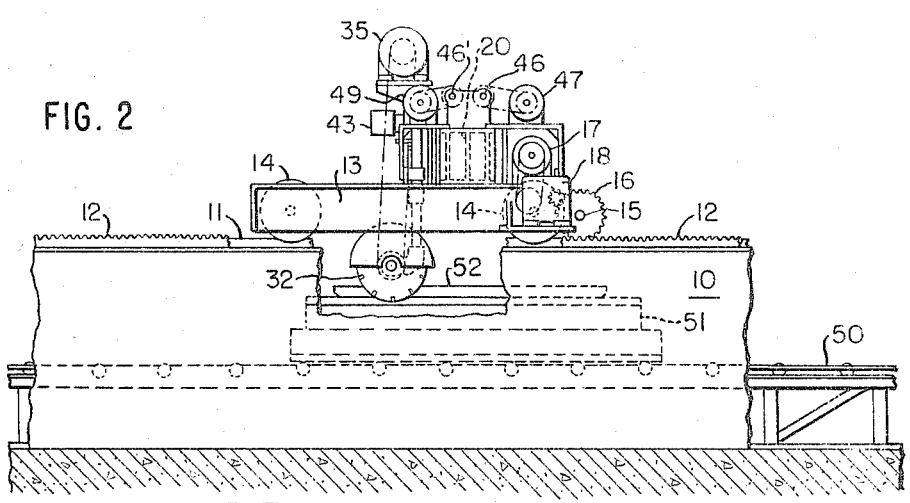
Figure 3:
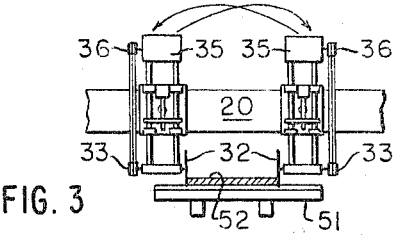
Figure 4:
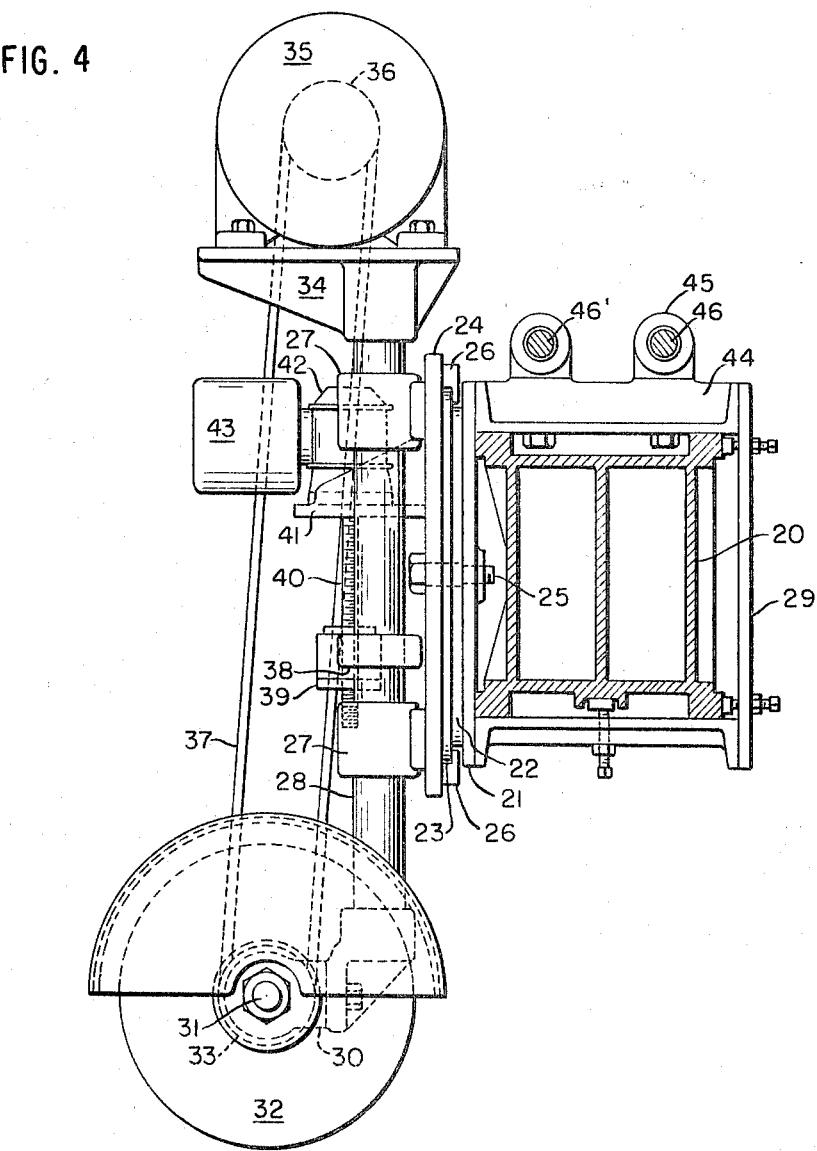
Figure 5:
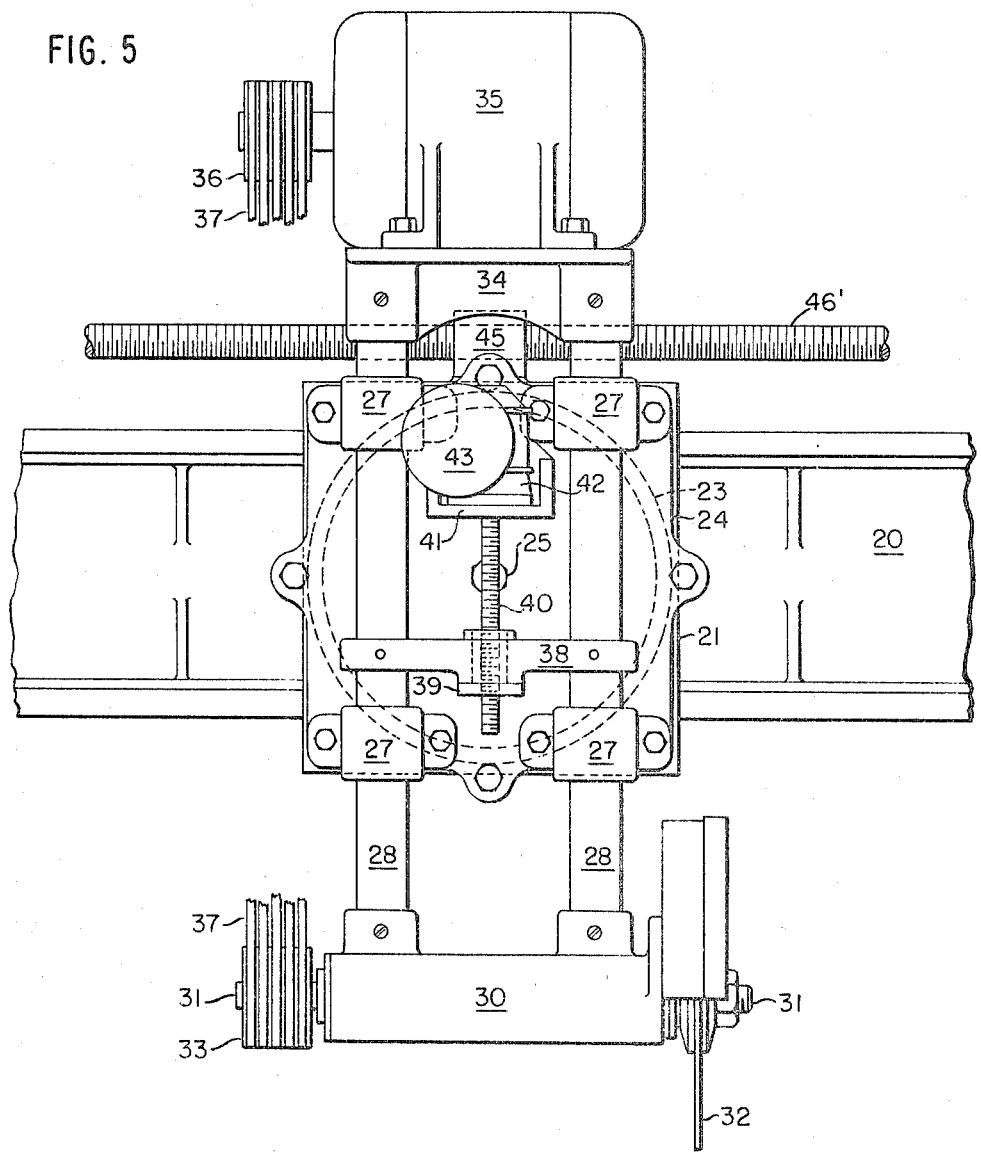

These and other features of the invention will be best understood and appreciated from the following description of a preferred embodiment thereof selected for purposes of illustration and shown in the drawings in which:

FIG. 1 is a view of the machine in front elevation,
FIG. 2 is a view in side elevation,
FIG. 3 is a diagram on a small scale suggesting the reversible feature of the saw heads,
FIG. 4 is a view in side elevation of one of the saw heads showing the bridge in section, and
FIG. 5 is a front elevation of one of the saw heads shown in position on the bridge of the machine.

The machine in its illustrated embodiment has parallel foundation walls 10 which may be constructed of reinforced concrete or the like. To the top of each wall 10 is secured a metal face plate carrying a V-shaped rail 11 and a rack 12.

A carriage is arranged to travel along each wall with a transverse bridge supported between them. Each carriage includes in its structure longitudinal channel bars 13 in which are journaled the ends of a transverse shaft 15. At its outer ends the shaft 15 carries pinions 16 meshing with the racks 12 and wheels 14 shaped to fit the rail 11. A motor 17 is mounted upon the bridge and connected through a driving belt and reducing gear 18 to the shaft 15. The motor 17 is controlled by a switch so that when desired the pinions 16 are simultaneously rotated by the shaft 15 and the whole carriage moved longitudinally in either direction upon the rails 11.

The carriages support a massive bridge 20 which rests at its ends upon the channel bars or beams 13 and is fabricated in square cross section as shown in FIG. 4. It is important that the bridge should be heavy and stiff in structure and if desired its interior may be packed with concrete. On the bridge is mounted a rectangular box frame 20 which includes an inner swivel plate 21 which supports a clamping disk 22, a second disk 23 and a side frame plate 24 which is a fixed part of the frame. The frame also includes a back plate 29 thus enclosing the beam 20 within the box frame. A swivel bolt 25 passes through these plates and disks and permits angular adjustment of the side frame plate 24 and all the elements of the saw head which are carried by it. Circumferential clamps 26 are provided for locking the rotary members of this assembly to the side frame plate 24.

The frame plate carries on its outer side two sets of projecting bearings 27 in which parallel rods 28 are slidably mounted. These rods are connected at their lower ends by a head or adaptor 30 in which is journaled a transverse shaft 31 carrying on one end a rotary saw 32 and on the other a pulley 33 for V-belts.

The top ends of the rods 28 are connected by a top frame or bracket 34 and upon this is mounted a motor 35. The motor is provided with a V-belt pulley 36 as is herein shown. The motor pulley and the saw pulley are connected by a gang of five V-belts 37. The motor in this case may be in the order of 15 H.P. more or less.

The rods 28 are connected at an intermediate point by a transverse yoke 38 to which is secured a nut 39. A screw 40 is threaded into this nut and received at its upper end in an angle bracket 41 secured to the frame side plate 24. Upon this bracket is mounted the casing 42 of a reduction gear and a motor 43 by which the screw 40 may be rotated to advance or retract the rods 28 together with the rotary saw and its operating motor 35. It will be understood here that these two elements are mounted at a fixed distance apart and that this is not disturbed by the angular adjustment or longitudinal feeding movement of the rods 28 with the saw. The motor 43 may be in the order of ½ H.P. The bearings 27 are spaced apart sufficiently to afford clearance for the full movement of the yoke 38 between them.

The frame enclosing the bridge 20 includes also in its structure a top plate 44 from which project bosses enclosing cross feed nuts 45 into which are threaded transverse feed screws 46. These are journaled at their opposite ends in bracket projecting upwardly from the bridge and at the right hand end of each screw, as seen in FIG. 1, is a motor 47, 49 connected through a gear reducing unit 48 and sprocket and chain to a sprocket wheel on the screw. The motors 47 are separately controlled so that the saw heads may be moved independently toward and from each other on the beam 20. A long table 50 is located between the walls 10 and is provided with rolls for a truck 51 upon which the slab such as that marked 52 may be brought into flat, horizontal position beneath the bridge. One of the first operations upon the slab is usually to simultaneously trim its opposite edges and for this operation the saws are disposed in vertical position as suggested in FIG. 3. They are then adjusted for height through the operation of the motor 43 and advanced longitudinally with the bridge under the control of the motor 17. The depth of the cut may be increased in the successive passage of the bridge by operation of the motor 43 in one or other of the saw heads.

When it is desired to impart the beveled edge contour to the block or slab 52 the heads are angularly adjusted to the position shown in FIG. 1 and the saws 32 are advanced at oblique angles with respect to the flat slab.

It has already been noted that the saw heads are constructed and arranged for reversible set up. In FIG. 3 the heads are set up with the saws 32 at the inner sides of the two heads while in FIG. 1 they are set up at the outer side of the heads and at an angle to impart a beveled cut to opposite sides of the slab 52.

From the foregoing description it will be apparent that the machine includes an individual motor for each of its functions, viz., the motor 17 for longitudinal feed, the motors 47 for transverse feed, the motors 43 for up and down feed of the saws, and the motors 35 for driving the saws. All of the motors are wired to a single control panel from which one operator controls the entire action of the machine.

It is noted that the bridge of this machine is designed to travel over the stone in process. The machine will work equally as well if the bridge were rigidly mounted on a foundation and the stone itself were propelled back and forth under the bridge and the saw heads thereon.

Having thus disclosed my invention and described in detail an illustrative embodiment thereof I claim as new and desire to secure by Letters Patent:

1. A dual head sawing machine comprising means for supporting a block of stone, a bridge movable lengthwise over the support and a saw head movable transversely on the bridge and including a vertically disposed plate, a disk concentrically mounted on the plate for angular adjustment, a pair of rods slidably mounted on said plate, a motor and rotary saw mounted on said rods at a fixed distance apart, and motor driven means also mounted on the plate for moving the rods longitudinally with their motor and saw in all angular positions of the rods with respect to the surface of the block beneath the bridge.

2. A dual head sawing machine as described in claim 1, further characterized in that the said pair of sliding rods are connected at an intermediate point in their length by a transverse yoke to which is connected motor driven mechanism for raising or lowering the rods with the saw and the saw-operating motor carried thereby.

3. A dual head sawing machine as described in claim 1, further characterized in that the said saw head includes a pair of bearings for each of the sliding rods, the bearing being spaced to provide full clearance for the movement between them of an intermediate yoke connecting the rods at an intermediate point in their length.

4. A dual head sawing machine as described in claim 1, further characterized in that two saw heads are mounted independently upon the bridge with feed screw means for each head, parallel sliding rods mounted in each head for independent transverse and angular adjustment, a motor driven saw carried by the sliding rods of each head, and power means for raising and lowering each of said saws independently of the other and in all angular positions of its sliding rods.

5. A dual head sawing machine as described in claim 1, further characterized in that the bridge carries two separate saw heads that are movable relatively and transversely on the bridge and that the saw heads are so adjustably mounted that the cutting planes of their rotary saws are convergent and that the said motor driven means advances the saws in their said convergent sawing planes thereby making simultaneously bevels on both side edges of the block on the supporting means.

References Cited by the Examiner

UNITED STATES PATENTS

| 1,691,519 | 11/1928 | Hutchinson | 144—3 |
| 1,772,818 | 8/1930 | Savage | 125—14 |
| 1,909,001 | 5/1933 | Nelson | 125—13 |
| 2,506,076 | 5/1950 | Garrison | 125—14 |

FOREIGN PATENTS

| 1,330,687 | 5/1963 | France. |

HAROLD D. WHITEHEAD, *Primary Examiner.*